(12) United States Patent
Iwata et al.

(10) Patent No.: US 7,232,597 B2
(45) Date of Patent: Jun. 19, 2007

(54) CORRUGATED POLYAMIDE TUBE

(75) Inventors: Yoshiro Iwata, Yamaguchi (JP); Hideki Fujimura, Yamaguchi (JP)

(73) Assignee: Ube Industries, Ltd. (JP)

( * ) Notice: Subject to any disclaimer, the term of this patent is extended or adjusted under 35 U.S.C. 154(b) by 408 days.

(21) Appl. No.: 10/853,104

(22) Filed: May 26, 2004

(65) Prior Publication Data

US 2004/0241368 A1    Dec. 2, 2004

(30) Foreign Application Priority Data

May 27, 2003    (JP) ............................. 2003-149899

(51) Int. Cl.
*B32B 1/08*     (2006.01)
*B32B 27/08*    (2006.01)
*B32B 27/34*    (2006.01)
*B32B 27/28*    (2006.01)
*F16L 11/11*    (2006.01)
*F16L 11/15*    (2006.01)
*F16L 11/20*    (2006.01)
*F16L 9/133*    (2006.01)

(52) U.S. Cl. ............... 428/36.9; 428/36.91; 428/474.4; 428/474.7; 428/474.9; 428/475.2; 138/121; 138/137; 138/140; 138/148; 138/173

(58) Field of Classification Search ............. 428/36.91, 428/36.9, 474.4, 474.7, 474.9, 475.2; 138/121, 138/137, 140, 148, 173
See application file for complete search history.

(56) References Cited

U.S. PATENT DOCUMENTS

| 4,303,104 | A  | * | 12/1981 | Hegler et al. ................ 138/121 |
| 4,754,781 | A  | * | 7/1988  | Jan de Putter ................ 138/98  |
| 6,864,348 | B2 | * | 3/2005  | Okushita et al. ............. 528/310 |
| 6,933,028 | B2 | * | 8/2005  | Milhas .................... 428/36.91 |
| 2005/0103392 | A1 | * | 5/2005 | Cheng et al. ................ 138/121 |

FOREIGN PATENT DOCUMENTS

| EP | 1314750 A1 | * | 5/2003 |
| JP | 59131628 A | * | 7/1984 |
| JP | 60158221 A | * | 8/1985 |
| WO | WO 03035384 A1 | * | 5/2003 |

* cited by examiner

*Primary Examiner*—Alicia Chevalier
*Assistant Examiner*—Chris Bruenjes
(74) *Attorney, Agent, or Firm*—Nixon Peabody LLP; Jeffrey L. Costellia

(57) ABSTRACT

A corrugated polyamide tube composed of a corrugated outer tube layer of polyamide resin and a flat inner tube layer fixed to the outer tube layer at bottom portions thereof, in which the inner tube layer is made essentially of a polyetheramide elastomer.

7 Claims, 1 Drawing Sheet

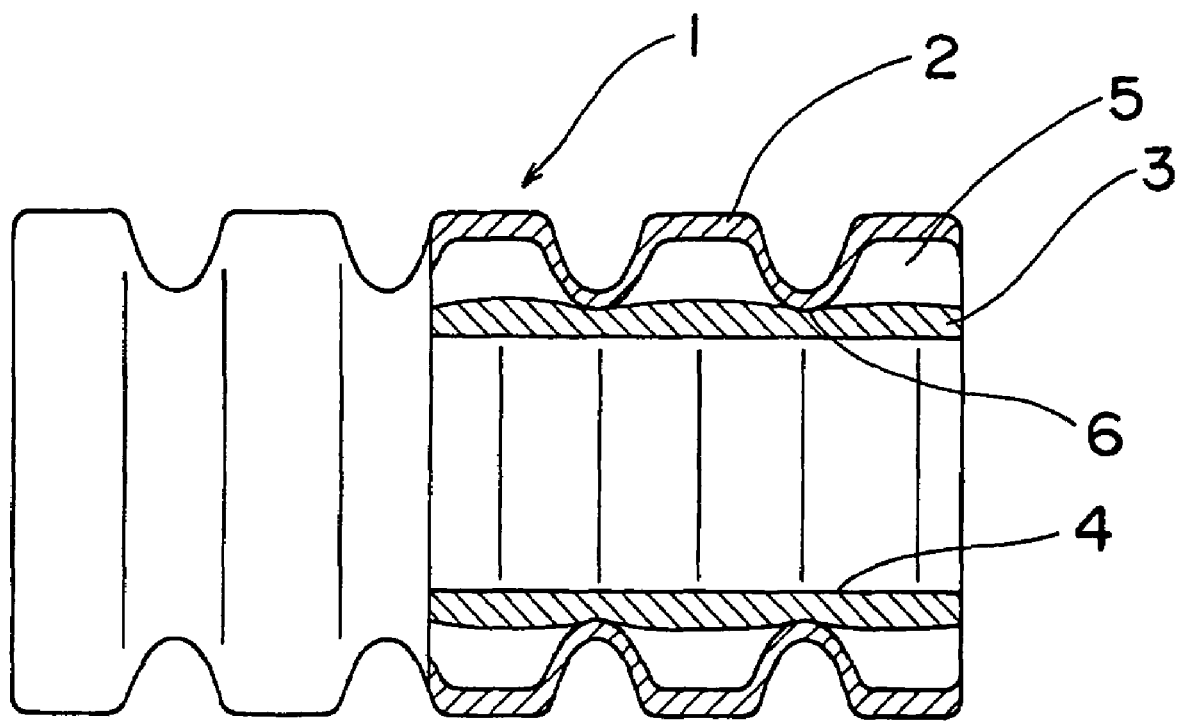

CORRUGATED POLYAMIDE TUBE

FIELD OF THE INVENTION

The present invention relates to a corrugated poly-amide tube which is favorably used as a tube in various industrial fields such as an industrially employable fluid-transporting tube, a liquid pharmaceutical-transporting tube, a combustible gas-transporting tube, or an automotive fuel-transporting tube.

BACKGROUND OF THE INVENTION

JA-62-93585 A discloses a multilayer plastic pipe comprising a corrugated outer rigid resin tube layer and an inner elastic flat resin tube layer. Typically, the outer rigid resin tube layer is made of polyolefin or polyvinyl chloride, and the inner elastic resin tube layer is made of an ethylene-based or propylene based thermoplastic elastomer.

WO 95/21051 discloses a corrugated multilayer tube comprising a corrugated outer resin layer and an inner resin layer. Typically, the outer resin layer is made of polyamide such as nylon 11, nylon 12, nylon 6 having resistance to zinc chloride, or their mixtures, and the inner layer is made of a fluorinated plastic material such as fluorinated polyvinylidene chloride, fluorinated polyvinyl, ethylenetetrafluoroethylene, and their mixtures. It is described that the disclosed multilayer tube is favorably employed as a hose to be installed in automobiles.

SUMMARY OF THE INVENTION

The present invention has an object to provide a corrugated multilayer resin tube having a high mechanical strength, a high flexibility, a high flexural resistance, and a high resistance to hydrolysis.

The present invention resides in a corrugated polyamide tube comprising a corrugated outer tube layer of polyamide resin and a flat inner tube layer fixed to the outer tube layer at bottom portions thereof, in which the inner tube layer comprises a polyetheramide elastomer.

The preferred embodiments of the invention are described hereinbelow.

(1) The polyetheramide elastomer contains at least 50 weight % of a polyetheramide elastomer prepared by polymerization of a tri-block polyetherdiamine compound, a polyamide-forming monomer selected from the group consisting of an aminocarboxylic acid and a lactam compound, and a dicarboxylic acid compound, the tri-block polyetherdiamine compound having the following formula (1):

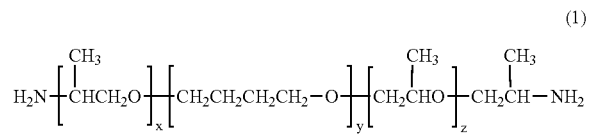

(1)

in which each of x and z independently represents an integer of 1 to 20, and y represents an integer of 4 to 50.

(2) The polyamide resin for the outer tube layer is an aliphatic polyamide resin.

(3) The aliphatic polyamide resin is selected from the group consisting of nylon 6, nylon 66, nylon 610, nylon 11, nylon 12, and nylon 612.

(4) The dicarboxylic acid has the formula (2):

$HOOC-(R^1)_m-COOH$ (2)

in which $R^1$ is a linking group containing a hydrocarbon chain and m is 0 or 1.

(5) The dicarboxylic acid is selected from the group consisting of an aliphatic dicarboxylic acid and an alicyclic dicarboxylic acid.

(6) The polyamide-forming monomer is an amino-carboxylic acid having the following formula (3) or a lactam compound having the following formula (4):

$H_2N-R^2-COOH$ (3)

(4)

in which each of $R^2$ and $R^3$ independently is a linking group having a hydrocarbon chain.

(7) The polyetheramide elastomer comprises 15 to 80 weight % of the following polyether segment (5):

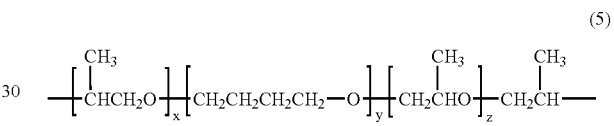

(5)

in which each of x and z independently is an integer of 1 to 20, and y represents an integer of 4 to 50.

BRIEF DESCRIPTION OF THE DRAWING

FIGURE illustrates a typical structure of the corrugated polyamide tube of the invention.

DETAILED DESCRIPTION OF THE INVENTION

The corrugated polyamide tube of the invention is described by referring to the attached drawing. In the FIG. of the drawing, a corrugated polyamide tube 1 is composed of a corrugated outer tube layer 2 and a flat inner tube layer 3 (flat particularly on the inner side 4) fixed to the outer tube layer 2 at bottom portions 6 of the outer tube layer 2. A packing material such as foamed resin can be placed in the spaces 5 formed between the outer tube layer 2 and the inner tube layer 3.

The corrugated polyamide tube of the invention can be connected to a straight tube such as a straight polyamide tube.

The corrugated outer tube layer comprises a polyamide and the flat inner tube layer comprises polyetheramide elastomer.

In the invention, the polyamide of the outer tube layer can be aliphatic polyamide, alicyclic polyamide, or aromatic polyamide. A relatively small amount of other thermoplastic resins such as polyolefin (e.g., polyethylene or polypropylene), maleic acid-denatured polyolefin, polyester, polycarbonate, polyurethane, and ABS resin can be incorporated into the outer polyamide tube layer.

Preferably, the polyamide is aliphatic polyamide or alicyclic polyamide. Particularly preferred is an aliphatic polyamide resin such as nylon 6, nylon 66, nylon 610, nylon 11, nylon 12, or nylon 612.

The flat inner tube layer 3 is flexible and comprises a polyetheramide elastomer which contains amide segments and ether segments.

The flat inner tube layer 3 comprises at least 50 weight % (preferably 60 weight % or more, more preferably 70 weight % or more, more preferably 80 weight % or more, most preferably 90 weight % or more) of the polyetheramide elastomer.

The polyetheramide elastomer can be produced from an aminocarboxylic acid compound or a lactam compound, a dicarboxylic acid, and a tri-block polyetherdiamine compound. The tri-block polyetherdiamine compound can be prepared by adding propylene oxides to both terminals of a poly(oxytetramethylene)glycol to give polypropylene glycol and reacting the resulting polypropylene glycol with ammonia at its both terminals.

The polyetheramide elastomer employed for the preparation of the flat inner tube layer is preferably prepared by polymerizing a polyamide-forming compound such as an aminocarboxylic acid compound and/or a lactam compound, the specific tri-block polyetherdiamine compound of the aforementioned formula (1), and a dicarboxylic acid compound.

The aminocarboxylic acid compounds and/or lactam compounds can be aliphatic, alicyclic or aromatic. Their examples include ω-aminocarboxylic acids, lactam compounds, compounds prepared from diamine and dicarboxylic acid, and their salts. The diamine can be an aliphatic diamine, an alicyclic diamine, an aromatic diamine, or one of their derivatives. The dicarboxylic acid can be an aliphatic dicarboxylic acid, an alicyclic dicarboxylic acid, an aromatic dicarboxylic acid, or one of their derivatives. Preferred is an aminocarboxylic acid prepared from an aliphatic diamine and an aliphatic dicarboxylic acid.

Examples of the diamine compounds include aliphatic diamine compounds having 2 to 20 carbon atoms such as ethylene diamine, triethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylenediamine, and 3-methylpentamethylene diamine.

Examples of the dicarboxylic acid compounds include aliphatic dicarboxylic acid compounds having 2 to 20 carbon atoms such as oxalic acid, succinic acid, glutaric acid, adipic acid, pimelic acid, suberic acid, azelaic acid, sebacic acid, and dodeca diacid.

Examples of the lactam compounds include aliphatic lactam compounds having 5 to 20 carbon atoms such as ε-caprolactame, ω-enantolactame, ω-undecalactam, ω-dodecalactame, and 2-pyrrolidone. Examples of the ω-aminocarboxylic acids include aliphatic ω-aminocarboxylic acids having 5 to 20 carbon atoms such as 6-aminocaproic acid, 7-aminoheptanoic acid, 8-aminooctanoic acid, 10-aminocapric acid, 11-aminoundecanoic acid, and 12-aminododecanoic acid.

The tri-block polyetherdiamine compound employed in the invention can be identified an XYX-triblock polyetherdiamine compound. Preferred examples of the XYX-triblock polyetherdiamine compounds include XTJ-533 (commercially available from HUNTSMAN Corp., USA: a compound of the formula (1) in which x is approx. 12, y is approx. 11, and z is approx. 11), XTJ-536 (commercially available from HUNTSMAN Corp.: a compound of the formula (1) in which x is approx. 8.5, y is approx. 17, and z is approx. 7.5), and XTJ-542 (commercially available from HUNTSMAN Corp.: a compound of the formula (1) in which x is approx. 3, y is approx. 9, and z is approx. 2).

Also preferred are an XYX-triblock polyetherdiamine compound in which x is approx. 3, y is approx. 14, and z is approx. 2); an XYX-triblock polyetherdiamine compound having the formula (1) in which x is approx. 5, y is approx. 14, and z is approx. 4), and an XYX-triblock polyetherdiamine compound having the formula (1) in which x is approx. 3, y is approx. 19, and z is approx. 2).

Examples of the dicarboxylic acid compounds are those described hereinbefore for the aminocarboxylic acid compound and/or lactam compound. In addition, dimer acids (i.e., dimerized aliphatic dicarboxylic acids having 14 to 48 carbon atoms which can be produced by dimerization of unsaturated fatty acids obtainable by fractional distillation of triglycerides) and their hydrogenated products (i.e., hydrogenated dimer acids); alicyclic dicarboxylic acids such as 1,4-cyclohexanedicarboxylic acid and aromatic dicarboxylic acids such as terephthalic acid and isophthalic acids can be employed. Examples of the commercially available dimer acids and hydrogenated dimer acids include Pripol 1004, Pripol 1006, Pripol 1009, and Pripol 1013.

The polyetheramide elastomer of the invention can be produced by fusing a mixture of the polyamide-forming compound, the tri-block polyetherdiamine compound, and a dicarboxylic acid at an atmospheric pressure or increased pressure to cause polymerization, and if desired, further fusing the mixture under reduced pressure to continue the polymerization. Otherwise, the polyetheramide elastomer can be produced by fusing first a mixture of the polyamide-forming compound and a dicarboxylic acid at an atmospheric pressure or increased pressure to give an oligomer and subsequently fusing a mixture of the oligomer and the triblock polyetherdiamine compound to cause polymerization, and if desired, further fusing the mixture under reduced pressure to continue the polymerization.

The polymerization can be carried out preferably at a temperature of 150 to 300° C., more preferably 160 to 280° C., most preferably 180 to 250° C.

In the case that the polyamide-forming compound is an ω-aminocarboxylic acid, the polymerization can be preferably carried out at an atmospheric pressure or at a combination of an atmospheric pressure and a reduced pressure.

In the case that the polyamide-forming compound is a lactam or a compound produced by diamine and dicarboxylic acid (or its salt), the polymerization can be preferably carried out at an increased pressure (such as up to 5 MPa) in the presence of an appropriate amount of water and then at an atmospheric pressure and/or a reduced pressure.

The period of time required for the polymerization generally is 0.5 to 30 hours.

The polymerization can be carried out by a batch system or a continuous system.

In the polymerization for production of the polyetheramide elastomer of the invention, one or more of appropriate additives can be employed for adjusting the molecular weight of the resulting elastomer or giving an elastomer which shows stable viscosity when the elastomer is molded or processed at an elevated temperature. Examples of the additives include monoamines and diamines such as laurylamine, stearylamine, hexamethylene diamine, and methaxylylene diamine, and monocarboxylic acids and dicarboxylic acids such as acetic acid, benzoic acid, stearic acid, adipic acid, sebacic acid, and dodeca di-acid. These additives can be employed in such an amount to give a polymer having a relative viscosity of 1.2 to 3.5 (0.5 wt./vol. %, in m-cresol, 25° C.).

In the polymerization for production of the polyetheramide elastomer of the invention, a catalyst can be employed, if desired. Examples of the catalysts include phosphoric acid, pyrophosphoric acid, polyphosphoric acid, phosphorous acid, hypophosphorous acid, and their alkali metal salts and their alkaline earth metal salts. Some of these inorganic phosphorus compounds can serve to impart heat resistance to the resulting polymer. The inorganic phosphorus compound can be employed in an amount of 50 to 3,000 ppm, based on the amount of a mixture of the starting compounds.

Other additives can be heat resistant agents, UV absorbers, anti-light stabilizers, oxidation inhibitors, antistatic agents, lubricants, anti-slipping agent, crystallizing nuclei, tackiness agents, sealing improvers, anti-foggants, releasing agents, plasticizers, pigments, dyes, perfume, flame retardant, and reinforcing materials.

The inner flat tube layer can further contains a relatively small amount of other thermoplastic materials such as polyamide.

The corrugated polyamide tube can be manufactured by the known methods.

The present invention is further described by the following examples. In the examples, the physical properties are values which are determined by the following procedures. In the following procedures, the test piece (i.e., specimen, JIS No.4 dumbbell specimen of 2 mm thick) is produced by subjecting the test resin to compression molding at 230° C. (preheating: 2 min., pressing: 2 min), cooled in a water-cooled die for one min., to give a resin sheet, and finally punching the resin sheet out to give the dumbbell test piece.

1) Relative viscosity ($\eta r$):

A polymer is dissolved in m-cresol (guaranteed re-agent) at a concentration of 0.5 w/v %). The measurement is carried out at 25° C. by means of Ostwald's viscometer.

2) Resistance to hydrolysis

The dumbbell specimen is immersed in hot water heated to 80° C. for 2,000 hours. Then, the specimen is taken out, and is fixed between a pair of chucks (distance between the chucks: 50 mm, gauge length: 20 mm) and extended at 23° C. in a tensile machine at a rate of 500 mm/min, to determine a tensile elongation.

3) Adhesion strength

The corrugated polyamide tube is cut to give a tube piece of 150 mm length. The tube piece is slitted in the length direction to give 8 test strips of even width. The test strip is fixed to a chuck of a universal testing machine at its 50 mm length, and the 180° peeling is measured. The extending rate is 10 mm/min., and the adhesion strength is determined using the adhesion peak strength.

4) Bending resistance

The corrugated polyamide tube is wound over a mandrel (diameter: 100 mm) in one reel and unwound. This winding-unwinding procedure is repeated ten times. Thereafter, the conditions of the tube are visually observed.

The conditions are marked as follows:

AA: neither creases nor kinks are observed on the surface of the inner tube layer.

BB: creases and kinks are observed on the surface of the inner tube layer.

5) Evaluation of flexural fatigue

The resin material is injected to produce a sheet of 3 mm thick. This sheet is cut out to give a specimen of 25 mm×150 mm. The specimen is subjected to flexural fatigue test by means of a de Mattia machine under the conditions of the distance between the chucks of 75 mm, the minimum distance of 19 mm, and flexural procedures of 300 times/min. The conditions are determined in consideration of the conditions defined in JIS K626. In this flexural fatigue test, a specimen having no cracks is employed, and the minimum flexing times until cracks are produced are measured. The test is repeated three times. An average value is recorded.

i) Coefficient of elasticity

The resin material is subjected to compression molding to give a resin sheet of 1 mm thick. From the resin sheet, the JIS No.4 specimen is prepared. The specimen is fixed between a pair of chucks (distance between the two chucks: 50 mm) and extended at 23° C. at a rate of 500 mm/min, to determine the coefficient of elasticity.

ii) Hardness

Shore D is measured according to ASTM D2240. The measurement is performed at 23° C. under the condition that a specimen of the resin material of 2 mm thick prepared by compression molding is placed on a plate of nylon 12.

iii) Flexural fatigue

A sheet of the resin material of 3 mm thick prepared by injection molding is cut to give a specimen of 25 mm×150 mm. The specimen is subjected to flexural fatigue by means of a de Mattia machine under the conditions of the distance between the chucks of 75 mm, the minimum distance of 19 mm, and flexural procedures of 300 times/min. The conditions are determined in consideration of the conditions defined in JIS K626. In this flexural fatigue test, a specimen having no cracks is employed, and the minimum flexing times until cracks are produced are measured. The test is repeated three times. An average value is recorded.

PREPARATION EXAMPLE 1

Polyetheramide (PAE-1)

In a pressure-resistant reaction vessel (inner volume: 70 L) equipped with a stirrer, a thermometer, a torque-meter, a pressure gauge, a nitrogen gas inlet, a pressure controller, and a polymer outlet were placed 7.000 kg of 12-aminododecanoic acid, 11.380 kg of tri-block polyetherdiamine (XTJ-542), and 1.620 kg of adipic acid. The gas inside of the reaction vessel was fully replaced with nitrogen gas. Subsequently, the content in the reaction vessel was heated to reach 230° C. for 3 hours under stirring in a stream of nitrogen gas at a rate of 300 L/hour. The temperature of the content was kept at 230° C. for 6 hours for performing polymerization. The pressure in the reaction vessel was adjusted to reach 0.05 MPa after the heating was started. Thereafter, the stirring was terminated, and the produced polymer was taken out through the polymer outlet in the form of a strand, cooled in water, processed to give approx. 13 kg of polymer pellets.

The resulting polymer is a flexible elastic white polyetheramide elastomer having $\eta r$ of 2.14.

PREPARATION EXAMPLE 2

Polyetheresteramide (PAE 2)

In a pressure-resistant reaction vessel (inner volume: 70 L) equipped with a stirrer, a thermometer, a torque-meter, a pressure gauge, a nitrogen gas inlet, a pressure controller, and a polymer outlet were placed 9.800 kg of 12-aminododecanoic acid and 0.766 kg of adipic acid. The gas inside of the reaction vessel was fully replaced with nitrogen gas.

Subsequently, the content in the reaction vessel was heated to reach 240° C. for 3 hours under stirring at 20 rpm in a stream of nitrogen gas at a rate of 300 L/hour. The temperature of the content was decreased to 230° C. and polymerization was performed for 4 hours to produce an oligomer of nylon 12.

In the reaction vessel, 9.434 kg of polytetramethylene glycol (PolyTHF 1800, available from BASF), 0.020 kg of tetrabutyl zirconate, and 0.050 kg of an oxidation inhibitor (Tominox 917 available from Yoshitomi Pharmaceutical Co., Ltd.) were added to the oligomer. The gas inside of the reaction vessel was fully replaced with nitrogen gas. Subsequently, the content in the reaction vessel was gradually heated to reach 210° C. for 3 hours under stirring at 20 rpm in a stream of nitrogen gas at a rate of 300 L/hour. The temperature of the content was kept at 210° C. for 3 hours for performing polymerization. The pressure in the reaction vessel was decreased to reach 50 Pa for one hour, and the polymerization was continued for 2 hours. The content was further heated to reach 230° C. and the pressure was decreased to approx. 30 Pa. Then, the polymerization was further performed for 3 hours. Thereafter, the stirring was terminated, and nitrogen gas was introduced into the inside of the reaction vessel to reach atmospheric pressure. Then, the produced polymer was taken out through the polymer outlet in the form of a colorless, transparent strand, cooled in water, processed to give approx. 13 kg of polymer pellets.

The resulting polymer is a flexible elastic white polyetheresteramide elastomer having ηr of 1.96.

EXAMPLE 1, AND COMPARISON EXAMPLES 1 TO 3

[Manufacture of Corrugated Polyamide Tube]

The resin materials set forth in Tables 1 to 3 were processed in a double layered corrugate pipe-molding machine of vacuum type, to give an outer polyamide tube layer (outer diameter: 50 mm, inner diameter: 44 mm, thickness: 1 mm) which was then molded to form a corrugated tube. Into the corrugated tube was extruded an inner tube layer (thickness: 0.5 mm), and the inner tube was fused to the bottom portions of the outer corrugated tube. Thus, the corrugated polyamide tube was manufactured. Thus produced corrugated polyamide tube was subjected to the aforementioned various evaluation procedures. The physical characteristics of the corrugated polyamide tube are set forth in Tables 1 to 3.

In the tables, PA12 is nylon 12, and EPR is ethylene-propylene elastomer.

TABLE 1

| Example | Corrugated tube | | Adhesion strength (N/mm) | Flexural resistance |
|---|---|---|---|---|
| | Outer layer | Inner layer | | |
| Example 1 | PA12 | PAE1 | 22 | AA |
| Com. Ex. 1 | PA12 | PAE2 | 18 | AA |
| Com. Ex. 2 | PA12 | PA12 | 26 | BB |
| Com. Ex. 3 | PA12 | EPR | extremely poor | — |

TABLE 2

| Example | | Coefficient of elasticity (MPa) | Hardness (scale hardness) | Times until flexural fatigue is observed |
|---|---|---|---|---|
| Example 1 | PAE1 | 51 | D40 | >1,200,000 |
| Com. Ex. 1 | PAE2 | 83 | D43 | >1,200,000 |
| Com. Ex. 2 | PA12 | 1,400 | D73 | not tested |
| Com. Ex. 3 | EPR | 5.5 | A55 | >1,200,000 |

TABLE 3

| | | Elongation | |
|---|---|---|---|
| | | Before hydrolysis | After hydrolysis |
| Example 1 | PAE1 | 610% | 620% |
| Com. Ex. 1 | PAE2 | 600% | 2% |
| Com. Ex. 2 | PA12 | 320% | 320% |
| Com. Ex. 3 | EPR | 700% | deformed |

The test results in Tables 1 to 3 confirm that the corrugated polyamide tube of Example 1 which has an inner flat tube layer comprising a polyetheramide elastomer has a high mechanical strength, a high flexibility, a high flexural resistance, and a high resistance to hydrolysis.

What is claimed is:

1. A corrugated polyamide tube comprising a corrugated outer tube layer of polyamide resin and a flat inner tube layer fixed to the outer tube layer at bottom portions thereof, in which the inner tube layer comprises a polyetheramide elastomer containing at least 50 weight % of a polyetheramide elastomer prepared by polymerization of a tri-block polyetherdiamine compound, a polyamide-forming monomer selected from the group consisting of an aminocarboxylic acid and a lactam compound, and a dicarboxylic acid compound, the tri-block polyetherdiamine compound having the following formula (1):

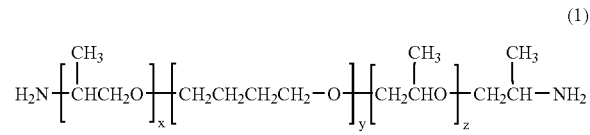

(1)

in which each of x and z independently represents an integer of 1 to 20, and y represents an integer of 4 to 50.

2. The corrugated polyamide tube of claim 1, wherein the polyamide resin is an aliphatic polyamide resin.

3. The corrugated polyamide tube of claim 2, wherein the aliphatic polyamide resin is selected from the group consisting of nylon 6, nylon 66, nylon 610, nylon 11, nylon 12 and nylon 612.

4. The corrugated polyamide tube of claim 1, wherein the dicarboxylic acid has the formula (2):

$HOOC-(R^1)_m-COOH$ (2)

in which $R^1$ is a linking group containing a hydrocarbon chain and m is 0 or 1.

5. The corrugated polyamide tube of claim 4, wherein the dicarboxylic acid is selected from the group consisting of an aliphatic dicarboxylic acid and an alicyclic dicarboxylic acid.

6. The corrugated polyamide tube of claim 1, wherein the polyamide-forming monomer is an aminocarboxylic acid having the following formula (3) or a lactam compound having the following formula (4):

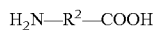 (3)

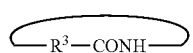 (4)

in which each of $R^2$ and $R^3$ independently is a linking group having a hydrocarbon chain.

7. The corrugated polyamide tube of claim 1, wherein the polyetheramide elastomer comprises 15 to 80 weight % of the following polyether segment (5):

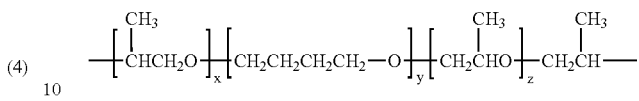 (5)

in which each of x and z independently represents an integer of 1 to 20, and y represents an integer of 4 to 50.

* * * * *